US010515216B2

(12) United States Patent
Boutnaru

(10) Patent No.: US 10,515,216 B2
(45) Date of Patent: Dec. 24, 2019

(54) MEMORY LAYOUT BASED MONITORING

(71) Applicant: PayPal, Inc., San Jose, CA (US)

(72) Inventor: Shlomi Boutnaru, Modi'in-Maccabim-Re'ut (IL)

(73) Assignee: PayPal, Inc., San Jose, CA (US)

( * ) Notice: Subject to any disclaimer, the term of this patent is extended or adjusted under 35 U.S.C. 154(b) by 118 days.

(21) Appl. No.: 15/638,575

(22) Filed: Jun. 30, 2017

(65) Prior Publication Data

US 2019/0005241 A1    Jan. 3, 2019

(51) Int. Cl.
| | |
|---|---|
| G06F 21/56 | (2013.01) |
| G06F 21/52 | (2013.01) |
| G06F 21/55 | (2013.01) |
| H04L 29/06 | (2006.01) |
| G06F 21/57 | (2013.01) |

(52) U.S. Cl.
CPC ............ *G06F 21/566* (2013.01); *G06F 21/52* (2013.01); *G06F 21/552* (2013.01); *G06F 21/554* (2013.01); *G06F 21/577* (2013.01); *H04L 63/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,210,873 | A * | 5/1993 | Gay | G06F 9/445 710/260 |
| 5,758,071 | A * | 5/1998 | Burgess | G06F 9/44505 709/213 |
| 7,987,445 | B2 * | 7/2011 | Fuller, III | G06F 8/34 345/630 |
| 8,701,192 | B1 * | 4/2014 | Glick | G06F 21/566 726/24 |
| 8,780,114 | B1 * | 7/2014 | Jackey | G06F 11/323 345/440 |
| 2004/0205303 | A1 * | 10/2004 | Naveh | G06F 12/0804 711/144 |
| 2004/0260678 | A1 * | 12/2004 | Verbowski | G06F 11/008 |
| 2009/0172664 | A1 * | 7/2009 | Mostafa | G06F 9/45504 718/1 |
| 2009/0257595 | A1 * | 10/2009 | de Cesare | G06F 21/575 380/277 |
| 2012/0030762 | A1 * | 2/2012 | Klein | G06F 21/554 726/23 |
| 2012/0239981 | A1 * | 9/2012 | Franke | G06F 11/368 714/38.1 |

(Continued)

*Primary Examiner* — Amine Riad
(74) *Attorney, Agent, or Firm* — Kowert, Hood, Munyon, Rankin & Goetzel, P.C.

(57) ABSTRACT

Techniques for monitoring based on a memory layout of an application are disclosed. A memory layout may be received, obtained, and/or generated from an application executing on a computer. Based on one or more attributes of a plurality of memory regions of the memory layout a memory layout fingerprint is generated. Additionally, memory region fingerprints are generated based on the one or more attributes for respective memory regions. The memory layout fingerprint and the memory region fingerprints are compared to respective previous memory layout fingerprints and the memory region fingerprints in order to determine whether malicious code and/or application drifting has occurred.

17 Claims, 8 Drawing Sheets

(56) References Cited

U.S. PATENT DOCUMENTS

| | | | | |
|---|---|---|---|---|
| 2013/0086299 A1* | 4/2013 | Epstein | ............... | G06F 12/1475 |
| | | | | 711/6 |
| 2014/0006375 A1* | 1/2014 | Forte | ......................... | G06F 8/71 |
| | | | | 707/709 |
| 2014/0283006 A1* | 9/2014 | Korkishko | .............. | G06F 21/44 |
| | | | | 726/16 |
| 2016/0004861 A1* | 1/2016 | Momot | ................. | G06F 21/552 |
| | | | | 726/23 |
| 2016/0023235 A1* | 1/2016 | Jelovac | ................. | B05C 17/005 |
| | | | | 222/145.1 |
| 2017/0068988 A1* | 3/2017 | Karlsson | ............ | G06Q 30/0246 |

\* cited by examiner

| | 104 | 106 | 108 | 110 | 112 | 114 |
|---|---|---|---|---|---|---|
| 104a | 104b | | | | | |
| 00400000 | -0040e000 | r-xp | 00000000 | 08:02 | 18505765 | /usr/bin/top |
| 0060e000 | -0060f000 | rw-p | 0000e000 | 08:02 | 18505765 | /usr/bin/top |
| 0060f000 | -00612000 | rw-p | 0060f000 | 00:00 | 0 | |
| 0c22a000 | -0c26c000 | rw-p | 0c22a000 | 00:00 | 0 | [heap] |
| 310b600000 | -310b61c000 | r-xp | 00000000 | 08:02 | 1014818 | /lib64/ld-2.5.so |
| 310b81c000 | -310b81d000 | r--p | 0001c000 | 08:02 | 1014818 | /lib64/ld-2.5.so |
| 310b81d000 | -310b81e000 | rw-p | 0001d000 | 08:02 | 1014818 | /lib64/ld-2.5.so |
| 310ba00000 | -310bb4f000 | r-xp | 00000000 | 08:02 | 1014820 | /lib64/libc-2.5.so |
| 310bb4f000 | -310bd4f000 | ---p | 0014f000 | 08:02 | 1014820 | /lib64/libc-2.5.so |
| 310bd4f000 | -310bd53000 | r--p | 0014f000 | 08:02 | 1014820 | /lib64/libc-2.5.so |
| 310bd53000 | -310bd54000 | rw-p | 00153000 | 08:02 | 1014820 | /lib64/libc-2.5.so |
| 310bd54000 | -310bd59000 | rw-p | 310bd54000 | 00:00 | 0 | |
| 310be00000 | -310be02000 | r-xp | 00000000 | 08:02 | 1014827 | /lib64/libdl-2.5.so |
| 310be02000 | -310c002000 | ---p | 00002000 | 08:02 | 1014827 | /lib64/libdl-2.5.so |
| 310c002000 | -310c003000 | r--p | 00002000 | 08:02 | 1014827 | /lib64/libdl-2.5.so |
| 310c003000 | -310c004000 | rw-p | 00003000 | 08:02 | 1014827 | /lib64/libdl-2.5.so |
| 310c200000 | -310c20d000 | r-xp | 00000000 | 08:02 | 1014992 | /lib64/libproc-3.2.7.so |
| 310c20d000 | -310c40d000 | ---p | 0000d000 | 08:02 | 1014992 | /lib64/libproc-3.2.7.so |
| 310c40d000 | -310c40e000 | r--p | 0000d000 | 08:02 | 1014992 | /lib64/libproc-3.2.7.so |
| 310c40e000 | -310c422000 | rw-p | 0000e000 | 08:02 | 1014992 | /lib64/libproc-3.2.7.so |
| 311e000000 | -311e04f000 | r-xp | 310c40e000 | 00:00 | 0 | |
| 311e04f000 | -311e24e000 | r-xp | 00000000 | 08:02 | 18500425 | /usr/lib64/libncurses.so.5.5 |
| 311e24e000 | -311e25c000 | ---p | 0004f000 | 08:02 | 18500425 | /usr/lib64/libncurses.so.5.5 |
| 311e25c000 | -311e25d000 | rw-p | 0004e000 | 08:02 | 18500425 | /usr/lib64/libncurses.so.5.5 |
| 2b9e8c458000 | -2b9e8c45b000 | r-xp | 311e25c000 | 00:00 | 0 | |
| 2b9e8c45b000 | -2b9e8c46b000 | rw-p | 2b9e8c458000 | 00:00 | 0 | |
| 2b9e8c46b000 | -2b9e8c46d000 | rw-p | 2b9e8c46b000 | 00:00 | 0 | |
| 2b9e8c46d000 | -2b9e8c477000 | r-xp | 00000000 | 08:02 | 1014842 | /lib64/libnss_files-2.5.so |
| 2b9e8c477000 | -2b9e8c676000 | ---p | 0000a000 | 08:02 | 1014842 | /lib64/libnss_files-2.5.so |
| 2b9e8c676000 | -2b9e8c677000 | r--p | 00009000 | 08:02 | 1014842 | /lib64/libnss_files-2.5.so |
| 2b9e8c677000 | -2b9e8c678000 | rw-p | 0000a000 | 08:02 | 1014842 | /lib64/libnss_files-2.5.so |
| 7fff42851000 | -7fff42866000 | rw-p | 7ffffffe9000 | 00:00 | 0 | [stack] |
| 7fff429fb000 | -7fff429ff000 | r-xp | 7fff429f7000 | 00:00 | 0 | [vdso] |
| ffffffff ff600000 | -ffffffff ffe00000 | ---p | 00000000 | 00:00 | 0 | [vsyscall] |

202 {
206 208 214
r-xp,00000000,/usr/bin/top
rw-p,0000e000,/usr/bin/top
rw-p,0060f000,
rw-p,1dec4000,[heap]
r-xp,00000000,/lib64/ld-2.5.so
r--p,0001c000,/lib64/ld-2.5.so
rw-p,0001d000,/lib64/ld-2.5.so
r-xp,00000000,/lib64/libc-2.5.so
r--p,0014f000,/lib64/libc-2.5.so
r--p,0014f000,/lib64/libc-2.5.so
rw-p,00153000,/lib64/libc-2.5.so
rw-p,310bd54000,
r-xp,00000000,/lib64/libdl-2.5.so
--p,00002000,/lib64/libdl-2.5.so
r--p,00002000,/lib64/libdl-2.5.so
rw-p,00003000,/lib64/libdl-2.5.so
r-xp,00000000,/lib64/libproc-3.2.7.so
--p,0000d000,/lib64/libproc-3.2.7.so
rw-p,0000d000,/lib64/libproc-3.2.7.so
rw-p,310c40e000,
r-xp,00000000,/usr/lib64/libncurses.so.5.5
--p,0004f000,/usr/lib64/libncurses.so.5.5
rw-p,0004e000,/usr/lib64/libncurses.so.5.5
rw-p,311e25c000,
rw-p,2b6f0b316000,
rw-p,2b6f0b329000,
r-xp,00000000,/lib64/libnss_files-2.5.so
--p,0000a000,/lib64/libnss_files-2.5.so
r--p,00009000,/lib64/libnss_files-2.5.so
rw-p,0000a000,/lib64/libnss_files-2.5.so
rw-p,7fffffe9000,[stack]
r-xp,7fff07d40000,[vdso]
--p,00000000,[vsyscall]

Figure 2

MEMORY LAYOUT BASED MONITORING

FIELD OF THE DISCLOSURE

This present disclosure generally relates to computer security. In particular, the present disclosure includes techniques relating to improving drift detection of applications executing on one or more computers and determining whether malicious and/or unauthorized code is executing on one or more computers.

INTRODUCTION

Software code that is executed by a computer can be used for malicious purposes, such as damaging data, altering system functionality, and/or using the computer without permission and/or knowledge of the computer's owner and/or user (even if the code also has legitimate purposes). There are many different types of malicious code, such as Trojan horses, remote control software, keystroke loggers, spyware, worms, viruses, and monitoring software, and a given computer program may fall into one or more of these categories.

One technique for preventing malicious code executing on a computer is to install anti-virus software on the computer in order to detect the presence of the code in files stored on the computer. However, it is sometimes not practical to execute anti-virus software on certain hardware platforms. Moreover, anti-virus software may fail to detect previously-unknown malicious code.

Accordingly, there is a need in the art for a way to detect malicious code and prevent it from spreading.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

FIG. 1 depicts a mapped virtual address space of a process of an application, according to embodiments of the present disclosure;

FIG. 2 depicts attributes of a mapped virtual address space of a process of an application to generate a fingerprint, according to embodiments of the present disclosure;

Figure 3:
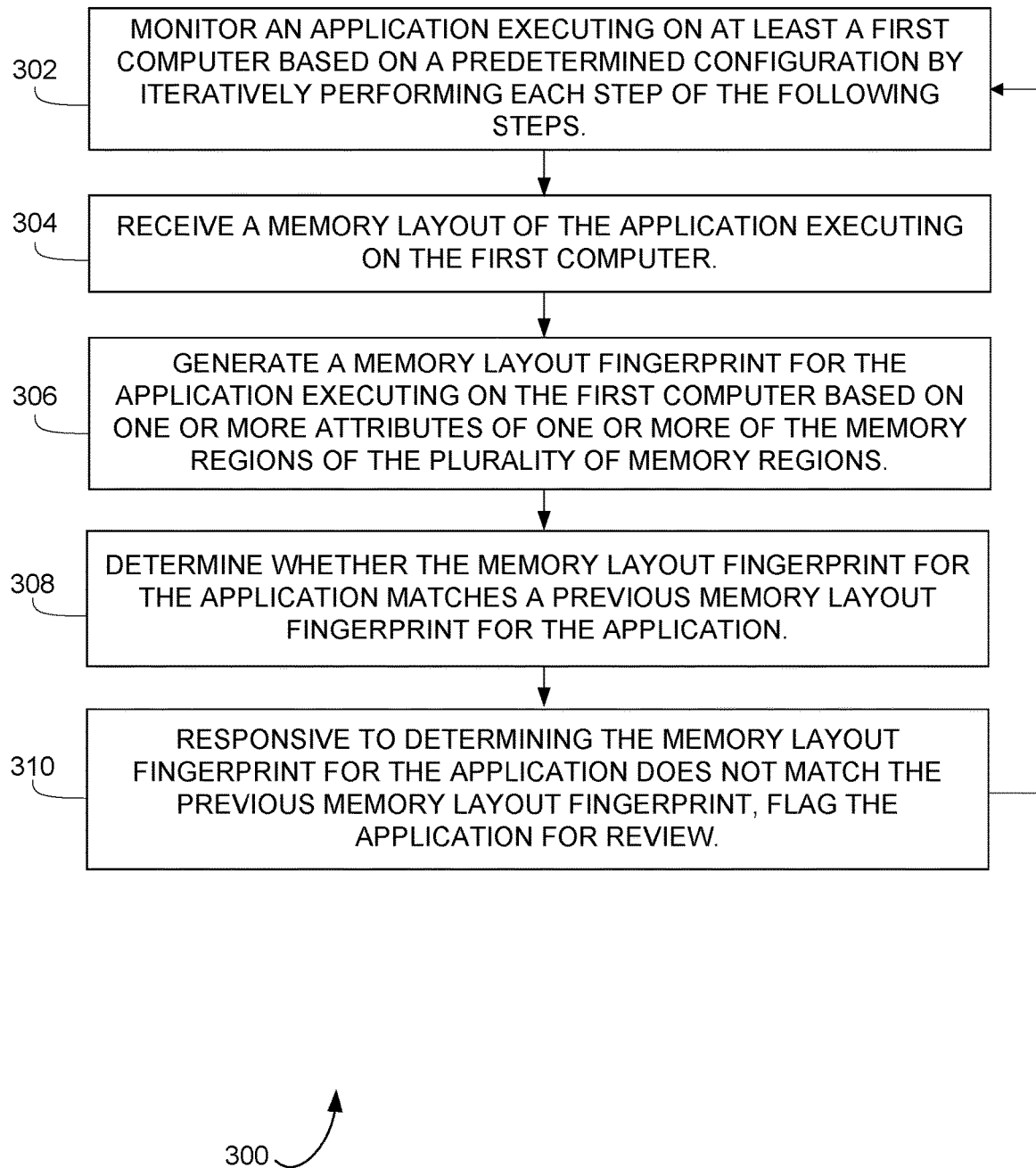
FIG. 3 depicts a method for memory layout based monitoring, according to embodiments of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The disclosed embodiments may be used to improve drift detection of one or more applications executing on one or more computers. Additionally, the disclosed embodiments may be used to determine whether malicious code is executing on one or more computers. When an application is executed on a computer, memory patterns for the application will often be present. These patterns in memory may be used to detect whether the application is drifting from normal operation, and/or used to detect whether malicious code has infected the computer.

For example, a known good application (e.g. an application known not to be malware) executing on a computer may have a known good memory layout, which may be used to generate a known good fingerprint for the application. The known good fingerprint may be compared to other instances of the application executing on the computer and/or one or more other computers that execute the application. Additionally, when a fingerprint generated from a memory layout of an application executing on the one or more computers does not match the known good fingerprint, further investigation may be made to determine whether the application is running malicious code and/or drifting too far from the known good application.

The disclosed embodiments may record and/or map a memory layout of an application executing on a computer in order to document changes in the application. The use of memory by an application may change during normal execution of the application, because of infection by one or more viruses, by manipulation of code of the application in memory, and/or by manipulation of code of libraries used by the application. For example, malware code may change specific features an application and/or regions of memory accessed by the application to modify the proper execution of the application.

Further, in order to determine whether malware code has made changes to regions of memory accessed by an application and/or to determine whether the application has drifted from normal operation, one or more known good fingerprint of corresponding one or more regions of a memory layout of the application may be used. For example, each region of a memory layout may be used to generate a region fingerprint based on one or more attributes of the region. The one or more region fingerprints may then be compared to previously generated region fingerprints to determine which parts of an application that may have changed.

As mentioned above, a known good fingerprint of a memory layout of an application may be used as a defense against cyber-attacks against the computer executing the application and/or other computers executing the application. Cyber security is constantly evolving to identify, prevent, and/or slow progression of attacks to critical infrastructure as well as personal computers. If malware code has modified a particular region of memory accessed by an application, a known good fingerprint of the memory layout of the application may detect a change in the application, and/or a known good region fingerprint of a region of the memory layout of the application may be used to detect a modified region of memory. Accordingly, it would be advantageous to generate known good fingerprints of memory layouts of applications to identify malware code and/or abnormal execution of applications. Thus, a number of advantages can be realized through the disclosed embodiments.

A memory layout of an application may be received, generated, and/or obtained from an operating system executing on a computer. As mentioned above, the memory layout of an application may be unique to the particular application and/or computer. When an application is executed, the executing application (also referred to as a process) may have its own unique memory layout. When the application is initially executed, the unique memory layout may be used to generate a known good fingerprint of the memory layout of the application to be used as a comparison point to later generated fingerprints of the application on the original computer generating the known good fingerprint and/or other computers running the same application on different computing systems. Each of these other computers may generate their own respective fingerprints based on the memory layout for the application executing on the respective other computers. Then, collectively and/or individually each of the respective fingerprints and known good fingerprint may be compared to determine which, if any, of the applications executing on the other respective computers have "drifted" from the known good fingerprint. For example, the fingerprints may be used to determine whether a computer has a different version of libraries on various computers, if a specific shared library has been changed, and/or if an application has been disguised as a different application.

Accordingly, fingerprints may be used for different types of comparison. In one comparison, a locally generated fingerprint of an application executing on a computer may be compared to a previously generated fingerprint (known good fingerprint) of the application executing on the computer. In another comparison, a known good fingerprint of an application executing on a computer may be compared to a plurality of other generated fingerprints on other respective computers. In yet another embodiment, a fingerprint of a plurality of fingerprints of applications executing on respective computers may be compare to the other fingerprints of the plurality of fingerprints.

As discussed in more detail below, the fingerprints may be generated based on one or more attributes of a memory layout of the application executing on the computer. A fingerprint generated based on the one or more attributes of a memory layout of an application may be different from a fingerprint generated based on a file of the application. For example, a fingerprint based on the file of the application may not include other files linked to the file to be executed. Further, an executing application may use shared libraries, which would not be included in the file of the application. In other words, in various instances, an executable file on a storage device, once loaded into memory, may assume a different profile based on certain resources used by the executable file, rather than just being an exact copy in RAM of how the executable file appears on a permanent storage device.

For example, OpenSSL may be used by an executing application. Two computers may be executing the same application, but may also be connected to different servers and/or have different versions of OpenSSL on the respective computer. Thus, fingerprints generated based on the application file alone may be the same. However, fingerprints generated based on the memory layout of the application would be different because the versions of OpenSSL (e.g., a first computer has SSL version 1.1 and a second computer has SSL version 1.2) are different on the respective computer. The fingerprints generated based on the respective memory layout of the corresponding computer may be different because of dynamic memory usage.

As discussed in more detail below, a fingerprint generated based on a memory layout of an executing application may provide information about an environment in which the application is executing. Once the application is executing, files of the application in storage of the computer may appear to have normal status, but the executing application (process) may be replaced by a malicious process after the process has been loaded by the operating system. Further, a hacker and/or a malicious user may go into memory of the computer and replace bytes in a region of memory in which the application is executing to execute malicious code. Thus, generating fingerprints based on the memory layout of the executing application may be used to prevent malicious code from executing, and may be used to determine drift among a plurality of computers.

The above and below described techniques may be used to continual monitor one or more applications executing on one or more computers to see how the application changes at various intervals.

Further, embodiments of the present disclosure may account for differences between computers and for randomization in laying out memory. For example, each application executing on computer uses a memory layout that may include one or more attributes that may be used to generate a fingerprint. When fingerprints are to be used for comparison with a single computer, the attributes used to generate the fingerprints may include attributes that correspond to the computer executing the application. When fingerprints are to be used for comparison with a plurality of computers, certain attributes may not be included in generating fingerprints. For example, one attribute may be a starting memory address and an ending memory address of a part of the process. However, as discussed in more detail below, because of address space layout randomization ("ASLR"), a starting address and an ending address may not be "static" for the application, as the memory address may change with a reboot of the computer and/or re-execution of the application. Further, other attributes may change depending on physical attributes of the computer systems. Thus, these other attributes may not be used to generate fingerprints when those fingerprints are to be compared against fingerprints from other computers.

Turning now to memory layout generation, source code for an application may be generated into an executable file to be executed by a computer. When the application is executed on a computer, instances of the application executing are referred to as processes. Each process, which is managed by an operating system ("OS"), may have its own address space in memory and may have its own identifier and execution state.

When an application is executed on a computer, memory allocators may layout memory in a plurality of different ways. For example, a memory allocator in GNU's c library ("glibc") may invoke one or more system calls to acquire memory from the OS. The memory allocator may then invoke system calls to increase the size of the heap, to load shared libraries, create new regions of memory for processes, etc.

When an application is executed, memory may be allocated immediately. Further, a process may execute within its own virtual address space, which is distinct from the virtual address spaces of other processes. The virtual address space may include four distinct types of content including executable code, static data, heap, and stack. The executable code of the virtual address space may include the binary code instructions of the application to be executed by a processor of the computer. In some embodiments of the present disclosure, the virtual address space having executable code may be write protected and shared among processes that use the same main program and/or the same shared libraries. The executable code of the virtual address space may be referred to as "text segment."

Static data of the virtual address space may include statically allocated variables to be used by the process. For example, static data may include data that is initialized in the code of the application by the programmer, e.g., "int x=42;", and block started by symbol ("BSS") code that is not initialized in the code of the application, e.g., "int;". The static data of the virtual address space may be referred to as "data segment," and BSS code may be referred to as "BSS segment."

Heap of the virtual address space may include dynamically allocated variables to be used by the process.

Stack of the virtual address space may include a stack to be used by the process for storing items such as return addresses, procedure arguments, temporarily saved registers, and/or locally allocated variables. Also, depending on the architecture, for example, on Intel's x64 platform, function arguments may be passed using the registers.

Each distinct type of content typically occupies one or several continuous region of memory within the virtual address space. The initial placement of these regions may be managed by the operating system. The content of these regions may be managed by the process. Additionally, the regions that include executable code and static data may have their memory layout determined by the compiler of the application because the executable code and static data may not change during process execution. The regions including the stack and the heap may change and/or grow during process execution.

As mentioned above, while the regions including the executable code and static data may be fixed in size, the regions including the heap and the stack may need to grow as the process owning them executes. The reason for growth may be difficult to predict during the initial placement of the regions. To avoid restricting the growth by placing the heap or the stack too close to other regions, the heap and the stack may be placed at opposite ends of the process virtual address space. The heap region may grow upwards as needed, and the stack region may grow downwards as needed.

FIG. 1 depicts an exemplary mapped virtual address space 100 of a process of an application, according to embodiments of the present disclosure. As shown in FIG. 1, the location of blocks of memory within the virtual address space of a process may be exported by a virtual memory manager of an operating system. For example, in the OS Linux, the virtual address space of a process may be exported by a virtual memory manager of an operating system in the maps file of the proc file system.

As shown in FIG. 1, each row may describe a region 102 of contiguous virtual memory of the process. Additionally, each row may include one or more of the following fields: address 104, permissions 106, offset 108, device 110, inode 112, and pathname 114.

The address 104 of a region 102 may include a starting address 104a and an ending address 104b in the region's address space of the process. Permissions 106 may describes how the memory may be accessed, and is represented with rwxp, where r may mean reading is permitted, w may mean writing is permitted, x may mean execution is permitted, and p may mean private. For example, if the permissions indicate r-xp, the region may mean reading permitted, writing is not permitted, execution is permitted, and is private, and if the permissions indicate rw-p, the region may be read, written, is private, but execution is not permitted.

Offset 108 may be an offset in a file of the application where the mapping begins. Device 110 may indicate a major and minor device number in hexadecimal where the file lives that if a region was mapped from a file. For example, the major number may point to a device driver, and the minor number may be interpreted by the device driver. Alternatively, the minor number may be a specific device for a device driver. Inode 112 may indicate a file number if the region was mapped from a file.

Pathname 114 may be a name of the file. Some regions may be special regions with names like [heap], [stack], [vdso], and [vsyscall]. [vdso], also referred to as virtual dynamic shared object, may export selected kernel functions to usermode to enable applications to call the functions in-process without suffering from a performance hit of the system call interface. [vsyscall] may allow for faster system calls without context switching between a user space and a kernel space. Functions of [vsyscall] may have been replaced by functions of [vdso], but [vsyscall] may remain for compatibility reasons.

[vsyscall] may be fixed to a memory address, such as ffffffff600000. As mentioned above, [vsyscall] may provide system call functions including one or more of gettimeofday( ), time( ), and/or getcpu( ). [vdso] may not be fixed to a memory address, and may be subject to address space layout randomization ("ASLR"), which is discussed below. [vdso] may provide system call functions including one or more of _vdso_clock_gettime; _vdso_getcpu; _vdso_gettimeofday; and/or _vdso_time.

The pathname 114 may also be a name and/or a version of a process and/or library. For example, a pathname may be "Python 2.7", and on another compute with a different version of Python may have a different pathname of "Python 2.7.1".

Additionally, some regions may not include a pathname, which may be anonymous regions. Anonymous regions may be created by a memory mapper, but anonymous regions may not be attached to any file. Anonymous regions may be used for miscellaneous things like shared memory, buffers not on the heap, etc.

The address 104 of the regions 102 may be randomized because of ASLR to prevent buffer overflow attacks on the process. These attacks may be performed by supplying the process with an input that will cause the process to write past the end of the buffer allocated for the input. When the buffer is a locally allocated variable, it resides on the stack and being able to write past the end of the buffer means being able to modify return addresses that also reside on the stack. The attack can therefore overwrite some of the input buffers with malicious machine code instructions to be executed and overwrite some of the return addresses to point to the malicious machine code instructions. The process will then unwittingly execute the malicious machine code instructions by returning to the modified return address. Randomizing the addresses of the blocks makes this attack more difficult. ASLR may work with virtual memory management of an OS to randomize the locations of different parts of the application in memory. Accordingly, every time the application is executed, regions (including the stack, heap, and libraries) may be moved to a different address in virtual memory.

As shown in FIG. 1, low addresses may be presented at the top of the virtual address space and the high address at the bottom of the virtual address space. However, the virtual address space may not be contiguous, as there may be different starting addresses 104a and ending addresses 104b for certain rows. Further, every time an application is executed, many of the regions may have different addresses. This may occur due to a security feature. By randomizing the address space for certain regions, attackers may have difficulty in acquiring a particular piece of memory in which the attacker may be interested.

There also may be regions 102 that are always fixed. For example, the text segment, data segment, and/or BSS segment may be fixed in order to know how to execute the application. For example, the text segment, data segment, and/or BSS segment may be fixed along with [vsyscall]. Alternatively, it is actually possible to create a position independent executable ("PIE") and/or position independent code ("PIC"), which make the text segment, data segment, and/or BSS segment randomized as well.

As mentioned above, from the low end of the address space, the heap may grow upwards, i.e., upwards in address numbers, and from the high end, the stack may grow downwards, i.e., downwards in address numbers. Additionally, the virtual address space 100 may include shared libraries that may be used by the application.

FIG. 2 depicts exemplary attributes of a mapped virtual address space 200 of a process of an application to generate a fingerprint, according to embodiments of the present disclosure. As shown in FIG. 2, each row may describe a region 202 of contiguous virtual memory of the process. Additionally, each row may include one or more of the following fields: permissions 206, offset 208, and pathname 214. A fingerprint may be generated based one or more of the attributes 206, 208, and 214 to be used for comparison on one or more other computers. Additionally, and/or alternatively, a fingerprint may be generated using attributes 104, as shown in FIG. 1.

Because the address 104 of regions 102 may be randomized due to ASLR and/or other reasons, the starting address 104a and the ending address 104b of the region 102 may be different on each computer, and may be different for each execution of the process on a single computer. Thus, the starting address 104a and the ending address 104b of the region 102 may not be used directly for generating a fingerprint. Instead, a size of the region 102 may be calculated, and the calculated size of the region 102 may be used in generating a fingerprint. Accordingly, for each region 102 of a process, a size of the region 102 of the process may be calculated based on the respective starting memory address 104a of the process and the respective ending memory address 104b of the process. In particular, the size of the region 102 may be calculated by subtracting a value of starting memory address 104a from a value ending memory address 104b. The resulting size of memory region 102 may then be used in generating the fingerprint with or without the other attributes of region 102.

FIG. 3 depicts a method 300 for memory layout based monitoring, according to embodiments of the present disclosure. Method 300 may begin at step 302 where an application executing on at least a first computer may be monitored based on a predetermined configuration by iteratively performing each step of the following steps. The predetermined configuration may include one or more of a predetermined update time, a dynamic threshold based on the application executing on the first computer, the application accessing one or more of a network, an operating system, a file, and/or a computer hardware change of the first computer.

For example the application executing on the at least the first computer may be monitored based on a predetermined update time, such as every 1 second, 1 minute, 5 minutes, 10 days, etc. The predetermined update time may be set to any time interval as needed to monitor the application executing on the at least the first computer. Additionally, the application may be monitored when the application accesses a network, such as the Internet, to detect the potential of malicious code being accessed. The application may be monitored when a hardware change occurs on the first computer and/or when an operating system executing on the first computer detects a change. Further, the application may be monitored based on the application setting a dynamic threshold.

At step 304, the method may receive a memory layout of the application executing on the first computer. The memory layout may include a plurality of memory regions of the application executing on the first computer, and each memory region may include one or more attributes of the memory region of the application executing on the first computer, as discussed above. For example, the one or more attributes of the memory region may include one or more of a size of a memory address of the memory region, one or more permission bases for the memory region, an offset for the memory region, a device identifier of the memory region, a hardware identifier of the memory region, an inode of the memory region, and/or a pathname of the memory region.

After the memory layout of the application is received, a memory layout fingerprint for the application executing on the first computer may be generated based on the one or more attributes of one or more of the memory regions of the plurality of memory regions at step 306. Further, after generating the memory layout fingerprint for the application based on the one or more attributes, the generated memory layout fingerprint may be hashed and/or may be salted and hashed. Then, the generated memory layout fingerprint may be deleted to, for example, free up storage space, and the hashed memory layout fingerprint may be retained for further use.

With the memory layout fingerprint being generated, the memory layout fingerprint for the application may be used to determine whether it matches a previous memory layout fingerprint for the application at step 308. For example, to determine whether memory layout fingerprint matches a previous memory layout fingerprint, the hashed memory layout fingerprint may be compared to a previous hashed memory layout fingerprint.

Then at step 310, responsive to determining the memory layout fingerprint for the application does not match the previous memory layout fingerprint, the application may be flagged for review. When the memory layout fingerprint matches the previous memory layout fingerprint, the application may be executing in an expected manner, and thus, the application may be operating within normal parameters. However, when the memory layout fingerprint does not match the previous memory layout fingerprint, malware code may have made changes to regions of memory accessed by the application and/or the application may have drifted from normal operation, and thus, further investigation and/or review of the application may be required. Flagging for review may include, for example, emailing an administrator, storing information in a log, generating an event in an enterprise management software and/or antivirus, etc.

Figure 4:
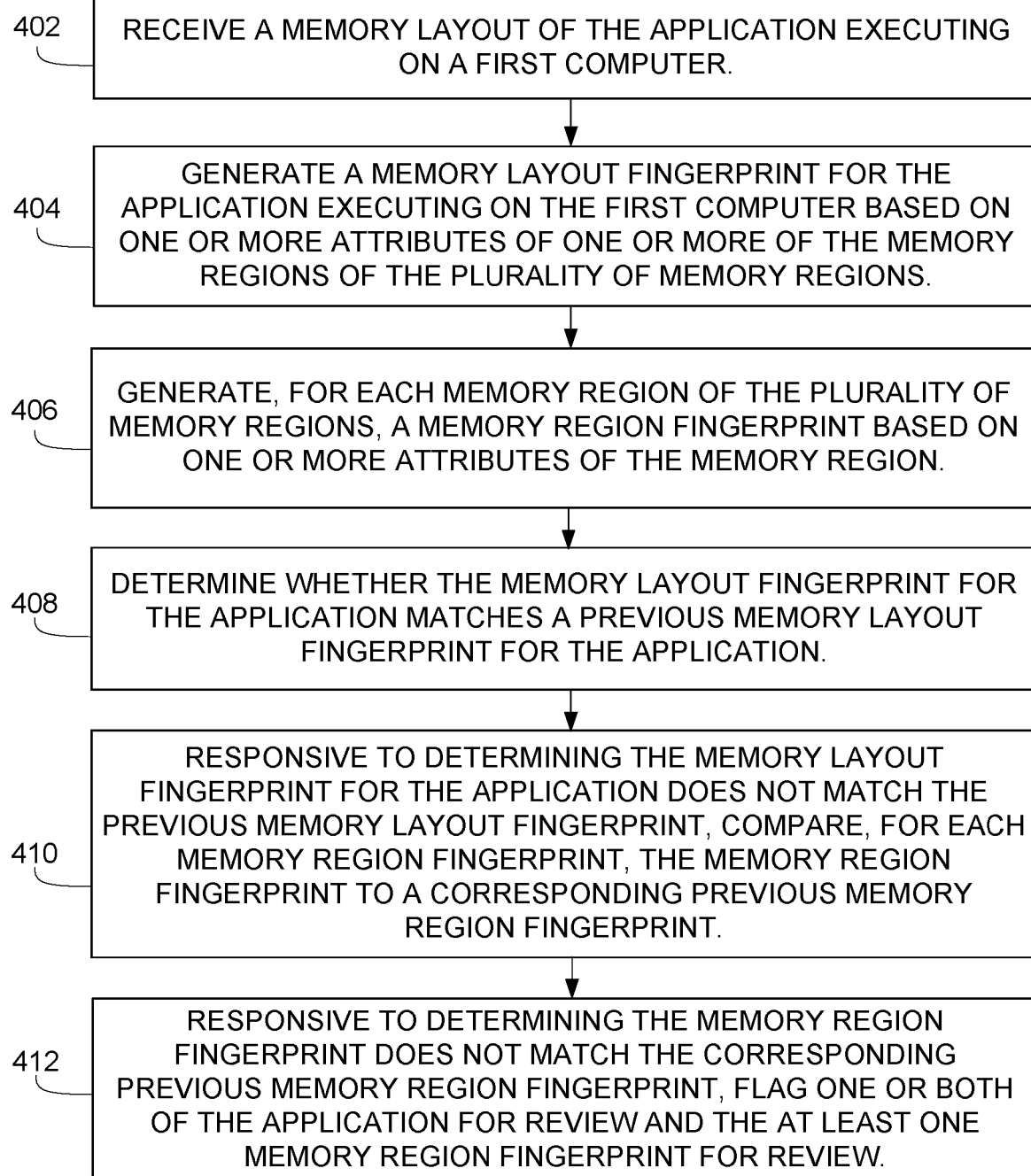
FIG. 4 depicts another method for memory layout based monitoring, according to embodiments of the present disclosure.

FIG. 4 depicts a method 400 for memory layout based monitoring, according to embodiments of the present disclosure. Method 400 may begin at step 402 where a memory layout of the application executing on a first computer may be received. The memory layout may include a plurality of memory regions of the application executing on the first computer, and each memory region may include one or more attributes of the memory region of the application executing on the first computer, as discussed above. For example, the one or more attributes of the memory region may include one or more of a size of a memory address of the memory region, one or more permission bases for the memory region, an offset for the memory region, a device identifier of the memory region, a hardware identifier of the memory region, an inode of the memory region, and/or a pathname of the memory region.

After the memory layout of the application is received, a memory layout fingerprint for the application executing on the first computer may be generated based on the one or more attributes of one or more of the plurality of memory regions at step 404. Further, after generating the memory layout fingerprint for the application based on the one or more attributes, the generated memory layout fingerprint may be hashed and/or may be salted and hashed. Then, the generated memory layout fingerprint may be deleted to, for example, free up storage space, and the hashed memory layout fingerprint may be retained for further use.

At step 406, a memory region fingerprint may be generated for each memory region of the plurality of memory regions. Each memory region fingerprint may be generated based on the one or more attributes of the memory region. Further, after generating the memory region fingerprints, each of the generated memory region fingerprints may be hashed and/or may be salted and hashed. Then, the generated memory region fingerprints may be deleted to, for example, free up storage space, and the hashed memory region fingerprints may be retained for further use.

With the memory layout fingerprint and memory region fingerprints being generated, the memory layout fingerprint for the application may be used to determine whether it matches a previous memory layout fingerprint for the application at step 408. For example, to determine whether memory layout fingerprint matches a previous memory layout fingerprint, the hashed memory layout fingerprint may be compared to a previous hashed memory layout fingerprint.

Then at step 410, responsive to determining the memory layout fingerprint for the application does not match the previous memory layout fingerprint, for each memory region fingerprint, the memory region fingerprint may be compared to a corresponding previous memory region fingerprint. Accordingly, if the memory layout fingerprint is determined not to match the previous memory layout fingerprint, further investigation may be done to determine which memory regions of the application executing on the first computer have changed. Thus, each memory region finger may be compared to a corresponding previous memory region fingerprint. If the memory region finger matches the corresponding previous memory region fingerprint, the particular memory region for the application may be executing in an expected manner, and thus, the particular memory region for the application may be operating within normal parameters.

As step 412, when at least one the memory region fingerprint does not match the corresponding previous memory region fingerprint, one or both of the application for review and the at least one memory region fingerprint may be flagged for review. Because malware code may have made changes to the application and the regions of memory accessed by the application and/or the application may have drifted from normal operation, further investigation and/or review of the application and the memory regions may be required. Flagging for review may include, for example, emailing an administrator, storing information in a log, generating an event in an enterprise management software and/or antivirus, etc.

Additionally, and/or alternatively, in response to determining that at least one memory region fingerprint does not match the corresponding previous memory region fingerprint, a percentage of memory region fingerprints that do not match a corresponding previous memory region fingerprint may be determined. Once the percentage of the memory region fingerprints that do not match the corresponding previous memory region fingerprints is determined, it may be determined whether the percentage is greater than or equal to a predetermined threshold. For example, if 5%, 10%, 20%, 30%, 40%, 50%, etc. or more of the memory regions do not match previous memory regions, then the application should be flagged for review. Of course the predetermined percentage may be any percentage, and/or the predetermined percentage may be dynamically adjusted based on the application executing on the first computer. Flagging for review may include, for example, emailing an administrator, storing information in a log, generating an event in an enterprise management software and/or antivirus, etc.

Figure 5A:
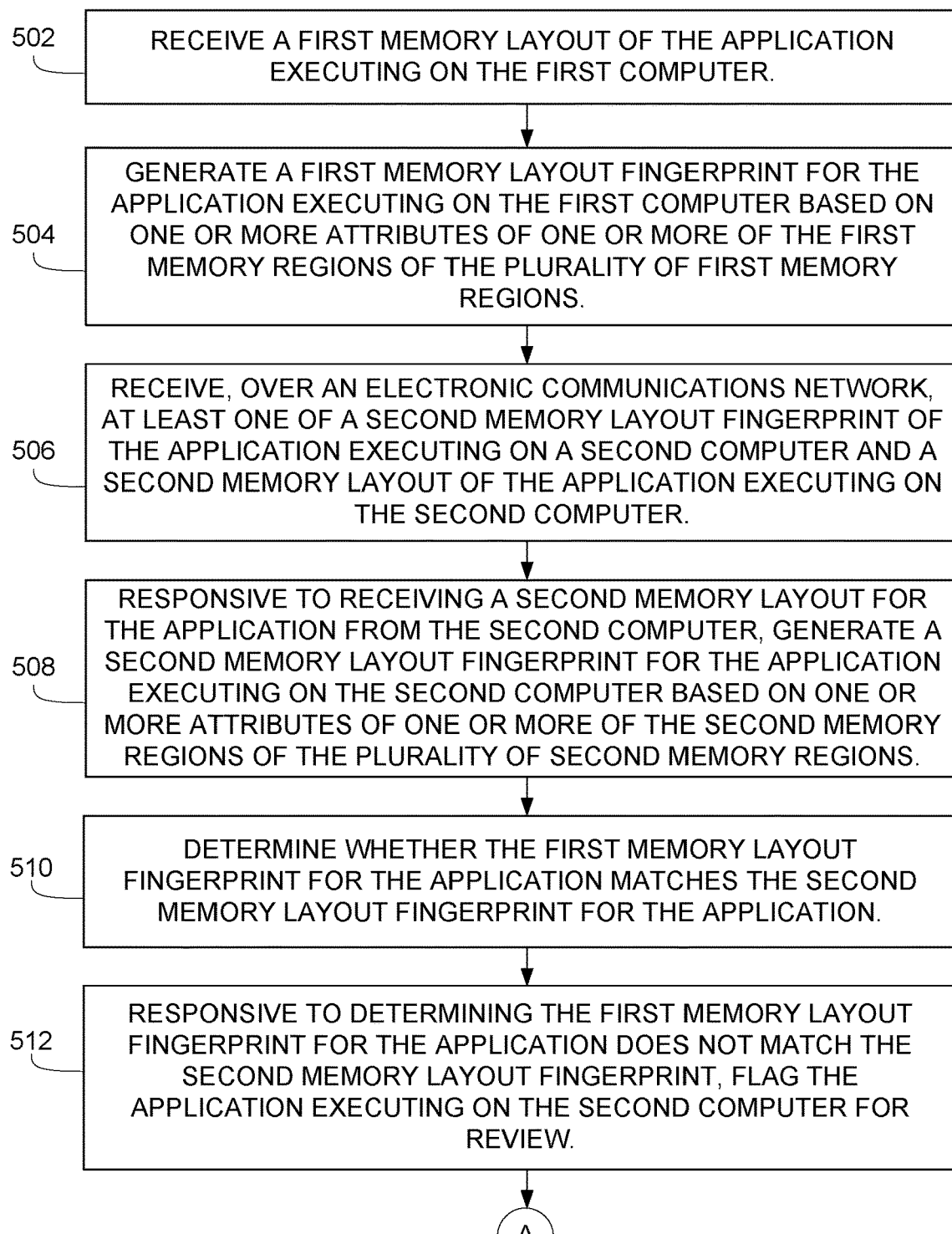
FIGS. 5A and 5B depict yet another method for memory layout based monitoring, according to embodiments of the present disclosure.
Figure 5B:
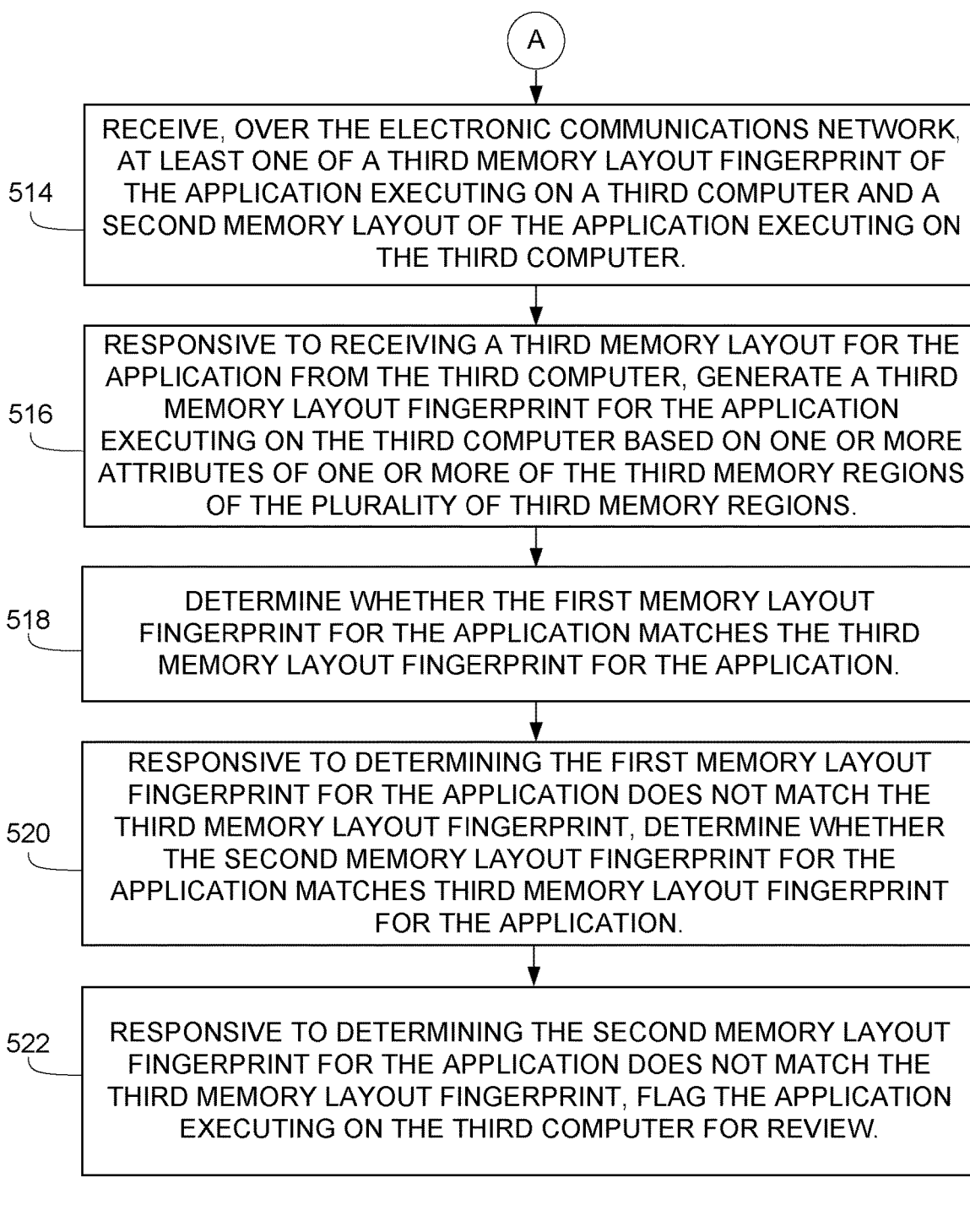

FIGS. 5A and 5B depict a method 500 for memory layout based monitoring, according to embodiments of the present disclosure. Method 500 may begin at step 502 where a first memory layout of the application executing on a first computer may be received. The first memory layout may include a plurality of first memory regions of the application executing on the first computer, and each first memory region may include one or more attributes of the first memory region of the application executing on the first computer, as discussed above. For example, the one or more attributes of the first memory region may include one or more of a size of a memory address of the first memory region, one or more permission bases for the first memory region, an offset for the first memory region, a device identifier of the first memory region, a hardware identifier of the first memory region, an inode of the first memory region, and/or a pathname of the first memory region.

After the memory layout of the application is received, a first memory layout fingerprint for the application executing on the first computer may be generated based on the one or more attributes of one or more of the plurality of first memory regions at step 504. Further, after generating the first memory layout fingerprint for the application based on the one or more attributes, the generated first memory layout fingerprint may be hashed and/or may be salted and hashed. Then, the generated first memory layout fingerprint may be deleted to, for example, free up storage space, and the hashed first memory layout fingerprint may be retained for further use.

At step 506, at least one of a second memory layout fingerprint of the application executing on a second computer and/or a second memory layout of the application executing on the second computer may be receiving, over an electronic communication network. The second memory layout may include a plurality of second memory regions of the application executing on the second computer, and each second memory region may include one or more attributes of the second memory region of the application executing on the second computer. Additionally, the application executing on the second computer may be the same application executing on the first computer in order to ensure that a memory layout fingerprint may be the same if both the first and second computer are operating normally.

In response to receiving the second memory layout for the application from the second computer, a second memory layout fingerprint for the application executing on the second computer may be generated based on one or more attributes of one or more of the second memory regions of the plurality of second memory regions at step 508. Further, after generating the second memory layout fingerprint for the application based on the one or more attributes, the generated second memory layout fingerprint may be hashed and/or may be salted and hashed. Then, the generated second memory layout fingerprint may be deleted to, for example, free up storage space, and the hashed second, memory layout fingerprint may be retained for further use.

Then, at step 510, the first memory layout fingerprint for the application may be used to determine whether it matches the second memory layout fingerprint for the application. For example, to determine whether first memory layout fingerprint matches second memory layout fingerprint, the hashed first memory layout fingerprint may be compared to the hashed second memory layout fingerprint.

At step 512, responsive to determining the first memory layout fingerprint for the application does not match the second memory layout fingerprint, the application executing on the second computer may be flagged for review. When the first memory layout fingerprint does not match the second memory layout fingerprint, malware code may have made changes to regions of memory of the second computer accessed by the application and/or the application executing on the second computer may have drifted from normal operation, and thus, further investigation and/or review of the application executing on the second computer may be required. Flagging for review may include, for example, emailing an administrator, storing information in a log, generating an event in an enterprise management software and/or antivirus, etc.

Additionally, and/or alternatively, when the first memory layout fingerprint matches the second memory layout fingerprint, the application may be executing in an expected manner, and thus, the application may be operating within normal parameters. Further, responsive to determining the first memory layout fingerprint for the application matching the second memory layout fingerprint, transmitting, over the electronic communication network, the first memory layout fingerprint for the application to a remote secure computer as a known good memory layout fingerprint.

At step 514, at least one of a third memory layout fingerprint of the application executing on a third computer and/or a third memory layout of the application executing on the third computer may be receiving, over the electronic communication network. The third memory layout may include a plurality of third memory regions of the application executing on the third computer, and each third memory region may include one or more attributes of the third memory region of the application executing on the third computer. Additionally, the application executing on the third computer may be the same application executing on the first computer and second computer in order to ensure that a memory layout fingerprint may be the same if the first, second, and third computers are operating normally.

In response to receiving the third memory layout for the application from the third computer, a third memory layout fingerprint for the application executing on the third computer may be generated based on one or more attributes of one or more of the third memory regions of the plurality of third memory regions at step 516. Further, after generating the third memory layout fingerprint for the application based on the one or more attributes, the generated third memory layout fingerprint may be hashed and/or may be salted and hashed. Then, the generated third memory layout fingerprint may be deleted to, for example, free up storage space, and the hashed third memory layout fingerprint may be retained for further use.

Then, at step 518, the first memory layout fingerprint for the application may be used to determine whether it matches the third memory layout fingerprint for the application. For example, to determine whether first memory layout fingerprint matches third memory layout fingerprint, the hashed first memory layout fingerprint may be compared to the hashed third memory layout fingerprint.

At step 520, responsive to determining the first memory layout fingerprint does not match the third memory layout fingerprint, the second memory layout fingerprint for the application may be used to determine whether it matches the third memory layout fingerprint for the application. For example, to determine whether second memory layout fingerprint matches third memory layout fingerprint, the hashed second memory layout fingerprint may be compared to the hashed third memory layout fingerprint. Additionally, and/or alternatively, responsive to determining the first memory layout fingerprint for the application does not match the third memory layout fingerprint, the first memory layout fingerprint for the application may be compared to a previous first memory layout fingerprint for the application to determine whether the fingerprints match. Then, responsive to determining the first memory layout fingerprint for the application does not match the previous first memory layout fingerprint, the application executing on the first computer may be flagged for review. Flagging for review may include, for example, emailing an administrator, storing information in a log, generating an event in an enterprise management software and/or antivirus, etc.

At step 522, responsive to determining the second memory layout fingerprint for the application does not match the third memory layout fingerprint, the application executing on the third computer may be flagged for review. When the first and second memory layout fingerprints do not match the third memory layout fingerprint, malware code may have made changes to regions of memory of the third computer accessed by the application and/or the application executing on the third computer may have drifted from normal operation, and thus, further investigation and/or review of the application executing on the third computer may be required. Additionally, and/or alternatively, responsive to determining the second memory layout fingerprint for the application matching the third memory layout fingerprint, the applications executing on the second computer and the third computer may be flagged for review. Flagging for review may include, for example, emailing an administrator, storing information in a log, generating an event in an enterprise management software and/or antivirus, etc.

Figure 6:
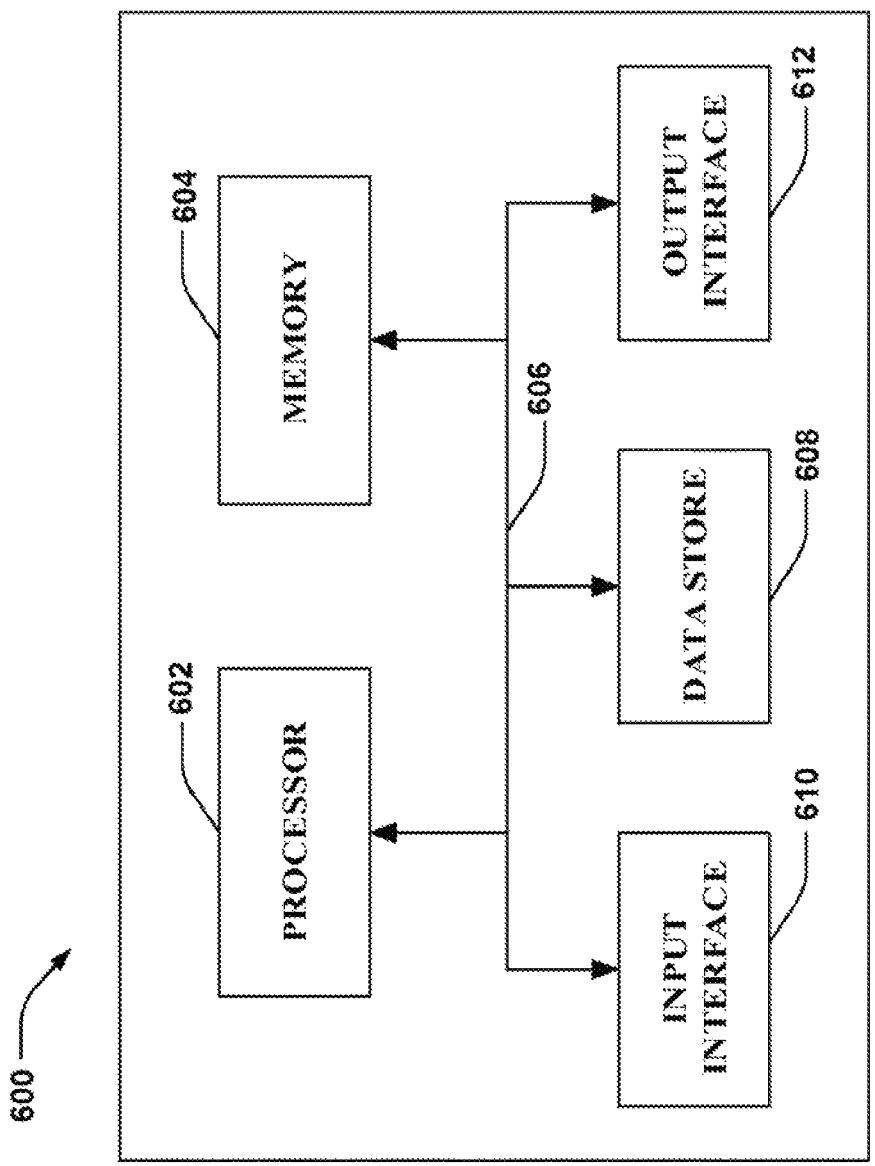
FIG. 6 depicts a high-level illustration of a computing device that may be used in accordance with the systems, methods, and computer-readable media disclosed herein, according to embodiments of the present disclosure.

FIG. 6 depicts a high-level illustration of an exemplary computing device 600 that may be used in accordance with the systems, methods, and computer-readable media disclosed herein, according to embodiments of the present disclosure. For example, the computing device 800 may be used in a system that performs memory layout based monitoring, according to embodiments of the present disclosure. The computing device 600 may include at least one processor 602 that executes instructions that are stored in a memory 604. The instructions may be, for example, instructions for implementing functionality described as being carried out by one or more components discussed above or instructions for implementing one or more of the methods described above. The processor 602 may access the memory 604 by way of a system bus 606. In addition to storing executable instructions, the memory 604 may also store fingerprints, hashes, snapshots, and so forth.

The computing device 600 may additionally include a data store 608 that is accessible by the processor 602 by way of the system bus 606. The data store 608 may include executable instructions, data, examples, features, etc. The computing device 600 may also include an input interface 610 that allows external devices to communicate with the computing device 600. For instance, the input interface 610 may be used to receive instructions from an external computer device, from a user, etc. The computing device 600 also may include an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 600 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for example, several devices may be in communication by way of a network connection and may collectively perform tasks described as being performed by the computing device 800.

Figure 7:
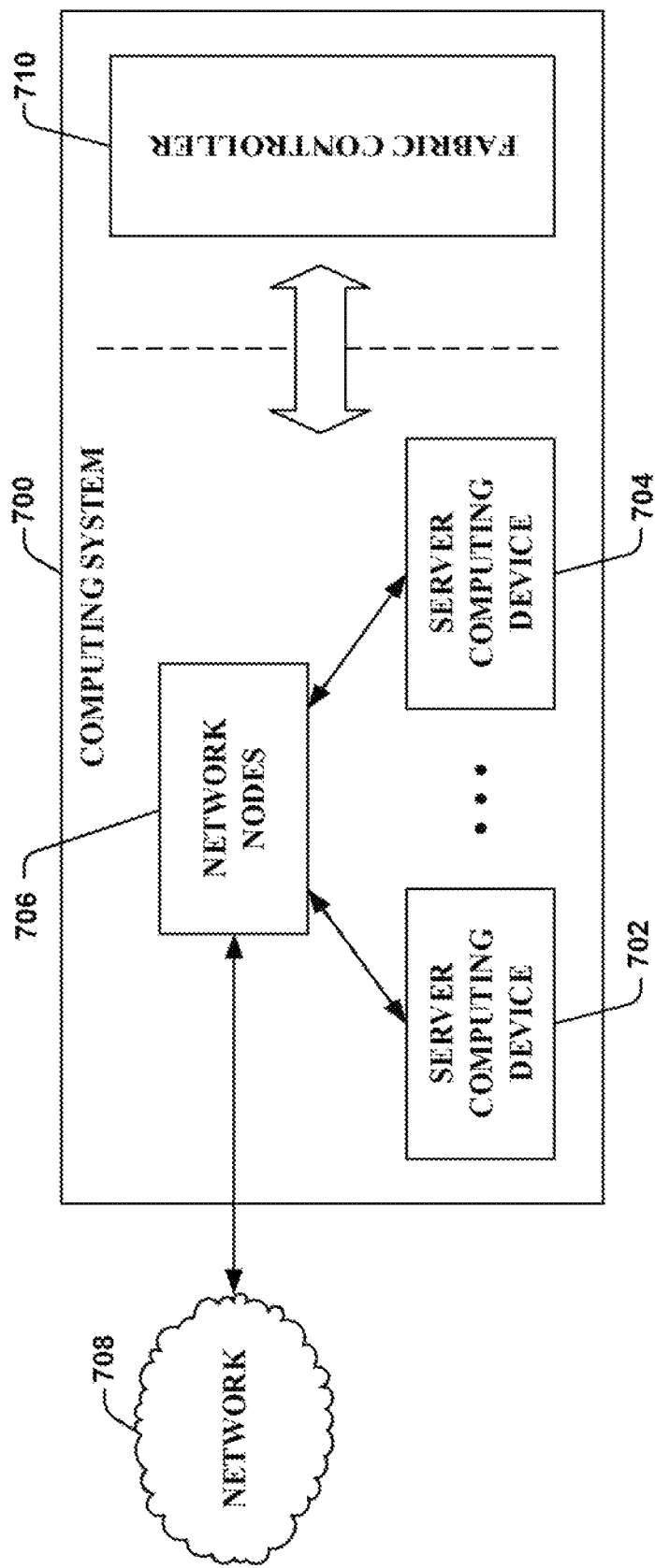
FIG. 7 depicts a high-level illustration of a computing system that may be used in accordance with the systems, methods, and computer-readable media disclosed herein, according to embodiments of the present disclosure.

Turning to FIG. 7, FIG. 7 depicts a high-level illustration of an exemplary computing system 700 that may be used in accordance with the systems, methods, and computer-readable media disclosed herein, according to embodiments of the present disclosure. For example, the computing system 700 may be or may include the computing device 600. Additionally, and/or alternatively, the computing device 600 may be or may include the computing system 700.

The computing system 700 may include a plurality of server computing devices, such as a server computing device 702 and a server computing device 704 (collectively referred to as server computing devices 702-704). The server computing device 702 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 702, at least a subset of the server computing devices 902-904 other than the server computing device 702 each may respectively include at least one processor and a memory. Moreover, at least a subset of the server computing devices 702-704 may include respective data stores.

Processor(s) of one or more of the server computing devices 702-704 may be or may include the processor, such as processor 602. Further, a memory (or memories) of one or more of the server computing devices 702-704 can be or include the memory, such as memory 604. Moreover, a data store (or data stores) of one or more of the server computing devices 702-704 may be or may include the data store, such as data store 608.

The computing system 700 may further include various network nodes 706 that transport data between the server computing devices 702-704. Moreover, the network nodes 706 may transport data from the server computing devices 702-704 to external nodes (e.g., external to the computing system 700) by way of a network 708. The network nodes 702 may also transport data to the server computing devices 702-704 from the external nodes by way of the network 708. The network 708, for example, may be the Internet, a cellular network, or the like. The network nodes 706 may include switches, routers, load balancers, and so forth.

A fabric controller 710 of the computing system 700 may manage hardware resources of the server computing devices 702-704 (e.g., processors, memories, data stores, etc. of the server computing devices 702-704). The fabric controller 710 may further manage the network nodes 706. Moreover, the fabric controller 710 may manage creation, provisioning, de-provisioning, and supervising of managed runtime environments instantiated upon the server computing devices 702-704.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A method comprising:
    receiving information indicative of a memory layout for an application executing on a first computer, wherein the memory layout includes a memory region allocated for the application as it is executing on the first computer, wherein the memory layout specifies one or more attributes associated with the memory region;
    generating a current memory layout fingerprint for the application based on at least one of the one or more attributes of the memory region;
    comparing the current memory layout fingerprint for the application to a previous memory layout fingerprint for the application, wherein the previous memory layout fingerprint was generated based on a previous memory layout associated with a previous execution of the application; and
    in response to the current memory layout fingerprint for the application not matching the previous memory layout fingerprint, flagging the application for review.

2. The method of claim 1, further comprising:
    monitoring the application as it is executed by the first computer to generate the information indicative of the memory layout.

3. The method of claim 2, wherein the monitoring the application is performed in response to detection of a particular condition, wherein the particular condition includes one or more of:
    a particular update time,
    a dynamic threshold based on the application,
    the application accessing one or more of a network, an operating system, and a file, and
    a computer hardware change of the first computer.

4. The method of claim 1, wherein the one or more attributes associated with the memory region further include one or more of:
    one or more permission bases for the memory region, an offset for the memory region, a device identifier of the memory region, a hardware identifier of the memory region, an inode of the memory region, and a pathname of the memory region.

5. The method of claim 1, wherein the generating the current memory layout fingerprint for the application includes:
    calculating a size of the memory region based on a starting memory address of the memory region and an ending memory address of the memory region.

6. The method of claim 1, wherein generating the current memory layout fingerprint for the application includes generating a hashed current memory layout fingerprint based on the current memory layout fingerprint; and
wherein comparing the current memory layout fingerprint to the previous memory layout fingerprint includes comparing the hashed current memory layout fingerprint to a hashed previous memory layout fingerprint.

7. The method of claim 6, further comprising:
deleting the current memory layout fingerprint after generating the hashed current memory layout fingerprint for the application.

8. The method of claim 6, wherein the generating the hashed current memory layout fingerprint includes salting and hashing the current memory layout fingerprint.

9. The method of claim 1, wherein the previous execution of the application was performed by a second, different computer.

10. The method of claim 1, wherein the comparing the current memory layout fingerprint to the previous memory layout fingerprint is performed while the application is being executed by the first computer.

11. The method of claim 1, wherein the one or more attributes associated with the memory region include one or more of:
a starting memory address of the memory region;
an ending memory address of the memory region; and
a size of the memory region.

12. The method of claim 11, wherein the one or more attributes includes a starting and ending memory addresses of the memory region but does not include a size of the memory region.

13. The method of claim 11, wherein the one or more attributes includes a starting memory address of the memory region and a size of the memory region but does not include an ending memory address of the memory region.

14. A system, comprising:
at least one processor; and
a non-transitory, computer-readable medium having instructions stored thereon that are executable by the at least one processor to cause the system to perform operations, the operations comprising:
receiving information indicative of a memory layout for an application executing on a first computer, wherein the memory layout includes a memory region allocated for the application as it is executing on the first computer, wherein the memory layout includes one or more attributes associated with the memory region;
generating a current memory layout fingerprint for the application based on at least one of the one or more attributes of the memory region;
comparing the current memory layout fingerprint for the application to a previous memory layout fingerprint for the application, wherein the previous memory layout fingerprint was generated based on a previous memory layout associated with a previous execution of the application; and
in response to the current memory layout fingerprint for the application not matching the previous memory layout fingerprint,
flagging the application for review.

15. The system of claim 14, wherein the one or more attributes associated with the memory region further include one or more of: one or more permission bases for the memory region, an offset for the memory region, a device identifier of the memory region, a hardware identifier of the memory region, an inode of the memory region, and a pathname of the memory region.

16. A non-transitory, computer-readable medium having instructions stored thereon that are executable by a computer system to perform operations comprising:
receiving information indicative of a memory layout for an application executing on a first computer, wherein the memory layout includes a memory region allocated for the application as it is executing on the first computer, wherein the memory layout includes one or more attributes associated with the memory region;
generating a current memory layout fingerprint for the application based on at least one of the one or more attributes;
comparing the current memory layout fingerprint for the application to a previous memory layout fingerprint for the application, wherein the previous memory layout fingerprint was generated based on a previous memory layout associated with a previous execution of the application; and
in response to the current memory layout fingerprint for the application not matching the previous memory layout fingerprint, flagging the application for review.

17. The non-transitory, computer-readable medium of claim 16, wherein the one or more attributes associated with the memory region include one or more of: one or more permission bases for the memory region, an offset for the memory region, a device identifier of the memory region, a hardware identifier of the memory region, an inode of the memory region, and a pathname of the memory region.

* * * * *